United States Patent

[11] 3,608,084

| [72] | Inventor | Joseph Matt |
| | | Chicago, Ill. |
| [21] | Appl. No. | 738,120 |
| [22] | Filed | June 19, 1968 |
| [45] | Patented | Sept. 21, 1971 |
| [73] | Assignee | Nalco Chemical Company |
| | | Chicago, Ill. |

[54] HALOGENATED ALIPHATIC NITRILES FOR CONTROLLING THE GROWTH OF AEROBACTER BACTERIA IN INDUSTRIAL WATER SYSTEMS
7 Claims, No Drawings

| [52] | U.S. Cl. | 424/304 |
| [51] | Int. Cl. | A01n 9/20 |
| [50] | Field of Search | 424/304; |
| | | 260/465.7; 162/161; 210/62, 64 |

[56] References Cited
FOREIGN PATENTS

| 117,464 | 10/1942 | Australia | 260/465.7 |
| 1,209,662 | 3/1960 | France | 424/304 |
| 17,995 | 11/1962 | Japan | 260/465.7 |

OTHER REFERENCES
Chem. Abs., Vol. 41, 1947, page 1797, Cottow et al.

*Primary Examiner*—Albert T. Meyers
*Assistant Examiner*—Allen J. Robinson
*Attorneys*—Marzall, Johnston, Cook & Root and John G. Premo

ABSTRACT: The growth and reproduction of Aerobacter bacteria in industrial aqueous systems is prevented by treating such systems with small amounts of certain halogenated aliphatic nitriles.

HALOGENATED ALIPHATIC NITRILES FOR CONTROLLING THE GROWTH OF AEROBACTER BACTERIA IN INDUSTRIAL WATER SYSTEMS

INTRODUCTION

The inhibition and control of the growth and reproduction of micro-organisms in waters used in industrial processes has long been recognized as a particularly burdensome problem. The environment of the aqueous medium itself is often extremely conducive to rapid multiplication and growth of these undesirable micro-organisms.

Only through the use of carefully tailored microbiocidal compositions can the growth and reproduction of these undesirable organisms be reliably controlled without detriment to the process in which the water is used. Without effective control, loss of product, inferior product, production-time loss, and other types of expensive problems may occur in the system.

The particular problems inherent in the microbiological control of an aqueous fluid medium are vastly different than those involving control of other harmful organisms in environmental conditions other than that of water. For example, many times a chemical is rendered completely inactive by the particular surrounding media containing the undesirable micro-organisms. Compounds such as ethylene oxide and betapropiolactone which are well-known fungicides, are completely or nearly completely inactive in aqueous media with regard to inhibition of growth and reproduction of the micro-organisms contained therein.

Many broad classes of biocidal agents are known to the art. It is also known that antiseptics, disinfectants, fumigants, fungistats, fungicides, preservatives, chemical and physical sterilants, and pasteurization agents must all be particularly designed to obviate the specific problem at hand.

The inherent chemical makeup of each class of composition intrinsically depends upon the organisms to be controlled and medium in which they are contained. Physical form, in addition to chemical configuration, may also be important. For example, in the control of insects the particular chemical normally must be low boiling and capable of volatilization in order to contact the undesirable pest. In like manner, a fumigant must have a high degree of toxicity to insects in all stages of life cycle.

One problem in the broad spectrum of microbiological control is that of industrial process water systems. A particular area involved is treatment of recirculating waters. Specifically, in order to economically utilize the aqueous industrial process media it is often necessary to recirculate it many times. This recirculation causes many difficult problems, among which is the gradual buildup and accumulation of undesirable micro-organisms in the aqueous fluid. Various species of bacteria and fungi are favorably produced in such an environment of recirculating use.

One of the most acute industrial biological control problems is that in papermill water systems which contain aqueous dispersions of papermaking fibers. The uncontrolled buildup of microbiological slime due to the accumulation of micro-organisms causes offgrade production, increased maintenance costs, decreased production because of breaks and the requirement of more frequent washups and excessive raw material usage. For example, slime deposits result in contamination of the stock by deposition thereon with consequent breaks in the the subsequent formed sheets. It has been discovered that chemical control of these micro-organisms will obviate the problems recited above. Application of selected slimicides to strategic locations throughout the papermaking process achieves good control and does away with potentially troublesome conditions.

In the papermill industry itself the widespread adoption of closed white water systems creates especially severe operating conditions since this system lends itself even more to accumulation of slime deposits by virtue of the continuous recycling of the white water. In order to overcome the problems created by the presence of slime in these closed white water systems, paper manufacturers have for a long time been seeking slime control agents which not only keep the slime in abeyance by inhibiting the growth of slime but also effect a kill and inhibit initial slime formation by impairment of a vital function of slime-forming organisms, namely, reproduction.

The extreme complexity of a papermaking system coupled with the favorable growth conditions for micro-organisms through the use of recirculating water causes slime masses to thrive and form throughout the various individual parts of the system. Particularly troublesome areas are corners of equipment, areas of poor stock flow, and high-density storage sites. These slime masses prevent normal flow of stock suspension, make the stock lumpy, and prevent normal sheet formation.

Generally, papermill systems contain from 0.1 percent to 15 percent by weight of cellulosic fiber material in the form of an aqueous pulp.

Another use of water in industry is that of an efficient cooling medium for industrial cooling towers, air conditioning equipment, internal combustion engines, and the like.

One of the most troublesome species of bacteria found in both papermill systems and industrial cooling systems is the aerobacter-species of bacteria. Typical microbes of this species are *Aerobacter cloacae* and *Aerobacter aerogenes*. These bacteria readily flourish in industrial cooling systems and in papermill systems and present acute problems. It would be beneficial if a microbiocide were available which could specifically control the growth and reproduction of *Aerobacter* bacteria, thereby greatly improving the operational efficiency of aqueous industrial systems of various types, particularly industrial cooling systems and pulp and papermill systems.

One of the characteristics most desirable in industrial microbiocide is that it be effective in extremely low dosages. Thus, a microbiocide which is effective in only a parts per million-range is a very desirable material as opposed to those that are operative in the 100–1000 parts per million-range. This allows a greater economic advantage to be gained.

It would be beneficial if it were possible to provide the users of industrial process waters with a microbiocide which would be effective in controlling the common species of *Aerobacter* bacteria at extremely low dosages and for long periods of time without regrowth of these noxious organisms occurring. A further advantage would be the provision of a microbiocide having the above-described characteristics which could be readily produced from simple chemicals and would be relatively inexpensive to use due to its low cost of manufacture and ability to work at extremely low dosages.

OBJECTS OF THE INVENTION

Based on the above it is an object of the invention to provide an improved microbiocide for industrial process systems, particularly industrial cooling systems and papermill systems.

Another object of the invention is to provide a bactericide effective against *Aerobacter* bacteria, which is effective at extremely low parts per million dosages.

A specific object of the invention is to provide an efficient microbiocide for preventing the growth and reproduction of *Aerobacter bacteria, which is readily synthesized from available organic chemicals.*

Other objects will appear hereinafter.

THE INVENTION

In accordance with the invention it has been found that the growth and reproduction of *Aerobacter* bacteria in industrial aqueous systems may be prevented by treating such systems with as little as 0.1 to about 50 p.p.m. of a halogenated aliphatic nitrile, having the formula:

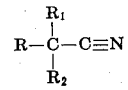

In the above formula $R_1$ and $R_2$ are radicals such as hydrogen, $CH_3$, Br and Cl. R is a radical such as H, Br, Cl and lower aliphatic hydrocarbon groups which contain not more than 5 carbon atoms. R may also be a Cl or Br substituted lower aliphatic radical which contains not more than 5 carbon atoms.

Compounds of the above type to be useful in the practice of the invention are further restricted in that the nitriles in the structural formula above do not contain more than 5 atoms of either bromine or chlorine. It is also important that at least one occurrence of R, $R_1$ or $R_2$ is Br with the following exceptions:

Where R is H and $R_1$ is Cl, then $R_2$ may be either Cl or Br.
In the case where R is H and $R_2$ is Cl, $R_1$ is either Cl or Br.
In the case where R is Cl, then at least one occurrence of $R_1$ or $R_2$ will be either chlorine or bromine.

Compounds of the above type, as indicated, work in dosages ranging in form as little as 0.1 to 50 p.p.m. In a preferred embodiment of the invention they are used to treat papermill systems or aqueous industrial cooling systems at dosages ranging between 1 to 10 p.p.m.

Typical halogenated aliphatic nitriles of the type shown in the general formula are such compounds as alpha, beta dibromoisobutyronitrile; alpha, beta dibromopropionitrile; alpha, beta-dichloroproprionitrile and dibromoacetonitrile. Of these typical compounds listed, alpha, beta dibromoisobutyronitrile is by far the most outstanding material from an economic and activity standpoint.

To illustrate a typical preparation of alpha beta dibromoisobutyronitrile from readily available materials, the following is given by way of example.

EXAMPLE I

In this example the starting materials were methacrylonitrile and
bromine, both of which materials are
inexpensive and readily obtained from many commercial sources.

(2.73 mole) 183 grams methacrylonitrile was stirred and heated to 40–50° C., in a 1–1¹:3-neck flask, fitted with a
thermometer, condenser, stirrer and dropping funnel, while
(2.73 mole) 436.8 grams bromine was added dropwise. The reaction temperature was maintained at 40–50° C. during the
addition by regulating addition rate and external cooling.
After about 1.5 hours the bromide had all been added, and the reaction was allowed to come to room temperature and was
stirred for 2 to 3 hours. The reaction mixture should turn pale orange or yellow. This material can be
used crude. Quantitative IR showed less than 0.1 percent starting
methacrylonitrile, $n^{25}$ D 1.5217; 99 percent yield.
If desired, the product may be washed with water, sodium bicarbonate, sodium thiosulfate and finally with water,
the dried over sodium sulfate, filtered, stripped via water aspirator, then vacuum distilled, BP 56° C. at 0.4 mm. Quantitative IR showed less than 0.1 percent starting material,
$n^{25}$ D about the same; the yields were slightly lower, probably due to mechanical losses.

EVALUATION OF THE INVENTION

In order to determine the efficacy of the invention for treating various types of industrial process waters under a wide variety of conditions, the following method was used. This test method correlates with the conditions existing in many industrial process systems where microbiological problems occur. This test method is set forth in detail below:

In this test the culture medium used consisted of 24 grams of dextrose, and 1 gram of "Basaminbact" added to 1 liter of Chicago tap water and sterilized by autoclaving under 15 pounds of pressure for 15 minutes. The final pH of the autoclaved medium was 6.8±0.1. An appropriate amount of 18- to 24-hour nutrient broth culture of *A. aerogenes* was mixed with 200 ml. of the culture medium immediately before starting tests, to give an innoculated culture medium having one million organisms per ml. of medium. This innoculated culture medium innoculated placed in each of a series of fermentation tubes with caps which contained the appropriate concentration of test chemical to give a final volume of test chemical and culture medium of 20 ml. in each tube. For this purpose the maximum volume of chemical introduced should be 0.5 ml. per tube to avoid chemical-solvent interference. Many solvent carriers of active materials are themselves somewhat effective, and efficient comparative testing requires that only small amounts of these solvents be introduced into the culture medium. The chemical and the innoculated medium were mixed gently. Two control tests were also run, one in absence of inoculum. In mixing, tubes were inverted in the *A. aerogenes* gas inhibition study so as to fill the gas detection vials. Inhibition ranges for *A. aerogenes* were determined by noting the presence or absence of gas production in the gas vials after 48 hours incubation of tubes at 90° F.

Using the above test method typical compositions of the invention were tested to show their efficacy in preventing the growth and inhibition of *Aerobacter aerogenes*. The results of all these tests are shown below in Table I.

TABLE I $$R-\underset{\underset{R_2}{|}}{\overset{\overset{R_1}{|}}{C}}-C\equiv N$$

| Compound No. | $R_1$ | $R_2$ | R | 48 hr. inhibition, p.p.m. |
|---|---|---|---|---|
| 1 | Br | $CH_3$ | $BrCH_2$ | 0.5–1.0 |
| 2 | Br | H | $BrCH_2$ | 1–2.5 |
| 3 | Cl | Cl | H | 1.0–2.5 |
| 4 | Cl | Br | $BrCH_2$ | 1.0–2.5 |
| 5 | Br | Br | H | 0.5–1.0 |
| 6 | Br | H |  BrCH– (phenyl) | >100 |
| 7 | Cl | Cl | $CH_2Cl$ | 10–25 |
| 8 | H | H | $BrCH_2BrCH$ | >100 |
| 9 | H | H | $ClCH_2ClCH$ | 5–10 |
| 10 | Cl | H | $CH_3ClCH$ | >100 |
| 11 | Cl | $CH_3$ | $ClCH_2$ | >100 |
| 12 | — | — |  (dibromophenyl) | >50 |

From Table I it is seen that compounds numbered 1–5 all were effective in controlling *Aerobacter aerogenes* at levels not in excess of 2.5 p.p.m. The other compounds listed, while in certain cases showing some activity, all work in excess of 5 p.p.m. and in certain instances, their inhibition range is greater than 100 p.p.m.

A more detailed observation of the results presented in Table I are presented below.

The test of Composition 6 shows that when an aromatic nucleus is present, the activity is diminished. Composition 7 illustrates the fact that when $R_1$ in the general structural formula is Chlorine, either R or $R_2$ must also be chlorine or Bromine. the tests for Compositions 8 and 9 show the importance that either $R_1$ or $R_2$ must contain a bromine atom or must each contain a chlorine atom for the compounds to be effective.

A similar showing is made in the test of Composition 10 where only $R_1$ is chlorine. This is also the showing of the test of Composition 11. The test of Composition 12 illustrates that a halo aromatic-substituted nitrile is relatively ineffective.

From the above, it is evident that there has been provided an improved method for controlling growth of *Aerobacter* specie bacteria in aqueous industrial process systems. One of the most important advantages obtained in the practice of the invention is that the compounds are operative at alkaline pH ranges e.g. 7.5–11. At these pH ranges, many industrial microbiocides are relatively ineffective and are incapable of controlling the untoward growth of various species of microorganisms.

It will be understood that the compositions of the invention for purposes of convenience in handling may be formulated to provide unitary compositions. When it is desired to formulate these materials, they may be readily dispersed or dissolved in a variety of organic solvents such as petroleum hydrocarbon liquids, dioxane, dimethylformamide, dimethylsulfoxide and the like. In many cases it is also desirable to include in such formulations from 1–10 percent by weight of a suitable surfactant which aids in dispersing the active halogenated aliphatic nitriles to the systems in which they are used.

It is also contemplated that the compositions of the invention may be used as the sole microbiocide-treating agent for industrial process systems, or they may be combined with other known biocides such as pentachlorophenol, chlorine, and the like to assist these materials in effectively controlling the growth and reproduction of other species of micro-organisms.

The halogenated aliphatic nitriles used in the practice of the invention are capable of controlling other species of micro-organisms commonly occurring in papermill systems and in industrial cooling fluids. When used for such systems, higher dosages are required to achieve substantial inhibition or kill effects. Surprisingly, it was discovered that the halogenated aliphatic nitriles are effective under conditions of alkalin pH.

Compound No. 1–Table 1, was tested in accordance with the procedure set forth in Tappi, Feb. 1963—"A Method for Determining the Effect of Dispersants in Slime Control Performance," by R. J. Michalski, L. L. Wolfson and J. R. Nelson. This test duplicates quite closely actual papermill conditions and indicated that the composition tested was effective in preventing slime formation at 100 parts per million.

Thus, when the compositions are used as a general papermill or cooling tower biocide, their dosage should be within the range of 10–200 parts per million.

Throughout the specification, bromine has been shown as a substituent of certain of the aliphatic halogenated nitriles. For purposes of this disclosure and the claims iodine is considered as an equivalent to and in included by the use of the halogen, bromine.

I claim:

1. A method of inhibiting the growth and reproduction of *Aerobacter* bacteria in an industrial aqueous system which comprises contacting said bacteria with a bactericidal amount of from 0.1 to 50 parts per million parts of said system of a halogenated aliphatic nitrile of the formula:

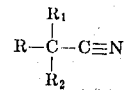

where $R_1$ and $R_2$ are selected from the group consisting of H, $CH_3$, Br and Cl, R is selected from group consisting of H, Br, Cl lower aliphatic hydrocarbon groups containing from 1–5 carbon atoms, and Cl and Br substituted lower aliphatic groups containing from 1–5 carbon atoms with the provisos:
  A. that said nitrile contains from 1–5 atoms of Br or Cl;
  B. that at least one occurrence of R, $R_1$ or $R_2$ is Br or that there is a double occurrence of Cl.

2. The method of claim 1 wherein:
$R_1$ is Br
$R_2$ is $CH_3$
R is $BrCH_2$

3. The method of claim 1 wherein:
$R_1$ is Br
$R_2$ is H
R is $BrCH_2$

4. The method of claim 1 wherein:
$R_1$ is Cl
$R_2$ is Cl
R is H

5. The method of claim 1 wherein:
$R_1$ is Cl
$R_2$ is Br
R is $BrCH_2$

6. The method of claim 1 wherein:
$R_1$ is Br
$R_2$ is Br
R is H

7. A method of inhibiting the growth and reproduction of *Aerobacter* bacteria in an industrial aqueous system which comprises contacting said bacteria with a bactericidal amount of from 10–200 parts per million parts of said system of a halogenated aliphatic nitrile of the formulas:

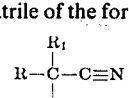

where $R_1$ and $R_2$ are selected from the group consisting of H, $CH_3$, Br and Cl, R is selected from he group consisting of H, Br, Cl, lower aliphatic hydrocarbon groups containing from 1–5 carbon atoms, and Cl and Br substituted lower aliphatic groups containing from 1–5 carbon atoms with the provisos:
  A. that said nitrile contains from 1–5 atoms of Br or Cl;
  B. that at least one occurrence of R, $R_1$ or $R_2$ is Br or that there is a double occurrence of Cl.

PO-1050
(5/69)

UNITED STATES PATENT OFFICE
CERTIFICATE OF CORRECTION

Patent No. 3,608,084      Dated September 21, 1971

Inventor(s) Joseph Matt

It is certified that error appears in the above-identified patent and that said Letters Patent are hereby corrected as shown below:

Column 3, line 16, "form" should read -- from --; line 22, at the end of the line insert -- dichloroacetonitrile; --; line 56, "the" should read -- then --.

Column 6, line 10, claim 1, "Cl" should read -- Cl, --.

Signed and sealed this 28th day of March 1972.

(SEAL)
Attest:

EDWARD M. FLETCHER, JR.      ROBERT GOTTSCHALK
Attesting Officer      Commissioner of Patents